United States Patent
Cho et al.

(10) Patent No.: US 12,462,155 B2
(45) Date of Patent: Nov. 4, 2025

(54) METHOD, SERVER, AND SYSTEM FOR DEEP METRIC LEARNING PER HIERARCHICAL STEPS OF MULTI-LABELS AND FEW-SHOT INFERENCE USING THE SAME

(71) Applicant: ELECTRONICS AND TELECOMMUNICATIONS RESEARCH INSTITUTE, Daejeon (KR)

(72) Inventors: Hyun Woo Cho, Daejeon (KR); Jeong Si Kim, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 702 days.

(21) Appl. No.: 17/880,229

(22) Filed: Aug. 3, 2022

(65) Prior Publication Data

US 2023/0252282 A1 Aug. 10, 2023

(30) Foreign Application Priority Data

Feb. 7, 2022 (KR) .................. 10-2022-0015642

(51) Int. Cl.
*G06N 3/08* (2023.01)
*G06N 5/04* (2023.01)

(52) U.S. Cl.
CPC .............. *G06N 3/08* (2013.01); *G06N 5/04* (2013.01)

(58) Field of Classification Search
CPC ............ G06N 3/08; G06N 5/04; G06N 3/096; G06N 3/045; G06N 3/084; G06N 3/09
See application file for complete search history.

(56) References Cited

U.S. PATENT DOCUMENTS

| | | | |
|---|---|---|---|
| 10,832,096 B2 | 11/2020 | Karlinsky et al. | |
| 11,748,613 B2 * | 9/2023 | Li | G06N 3/04 704/9 |
| 2019/0066373 A1 * | 2/2019 | Tran | G06F 18/253 |

(Continued)

FOREIGN PATENT DOCUMENTS

| | | | | |
|---|---|---|---|---|
| CN | 109145129 A | * | 1/2019 | ............... G06N 3/02 |
| KR | 10-2019-0056009 A | | 5/2019 | |

OTHER PUBLICATIONS

Changsheng Li, et al., "Reconstruction Regularized Deep Metric Learning for Multi-Label Image Classification", IEEE Transaction on Neural Networks and Learning Systems, vol. 31, No. 7, pp. 2294-2303, Jul. 2020.

(Continued)

*Primary Examiner* — Tyler J Torgrimson
(74) *Attorney, Agent, or Firm* — Rabin & Berdo, P.C.

(57) ABSTRACT

A method for deep metric learning per hierarchical step of multi-labels and few-shot inference using the same is provided, which includes sampling a plurality of N multiplets from a learning data set that is expressed by hierarchical multi-labels; configuring the N multiplets into triplets or quadruplets so as to correspond to the number of classes in each hierarchy; performing a metric learning per hierarchical step for a deep neural network model based on the configured triplets and quadruplets; and distributing, to an embedded device, the deep neural network model from which a loss function is removed as the metric learning is completed.

18 Claims, 9 Drawing Sheets

(56) References Cited

U.S. PATENT DOCUMENTS

2020/0302291 A1    9/2020   Hong
2021/0303982 A1    9/2021   Lee et al.

OTHER PUBLICATIONS

Cerri, Ricardo et al., Hierarchical multi-label classification using local neural networks, Journal of Computer and System Sciences 80, 2014, pp. 39-56, Sao Carlos, Brazil.

Xiaoxu Li, et al., Deep Metric Learning for Few-Shot Image Classification: A Selective Review, Computer Vision and Pattern Recognition (cs.CV); Machine Learning (cs.LG), arXiv:2105.08149v1 [cs.CV], pp. 1-18, May 17, 2021.

\* cited by examiner

METHOD, SERVER, AND SYSTEM FOR DEEP METRIC LEARNING PER HIERARCHICAL STEPS OF MULTI-LABELS AND FEW-SHOT INFERENCE USING THE SAME

CROSS-REFERENCE TO RELATED APPLICATION

This application claims priority to and the benefit of Korean Patent Application No. 10-2022-0015642, filed on Feb. 7, 2022, the disclosure of which is incorporated herein by reference in its entirety.

BACKGROUND

1. Technical Field

The present disclosure relates to a method, a server, and a system for deep metric learning per hierarchical step of multi-labels and few-shot inference using the same for an embedded device.

2. Related Art

Metric learning of a neural network in the related art adopts a method for learning a neural network model so that a Euclidean distance between two samples in an embedding space represents a meaningful distance.

However, the embedding space obtained through the existing neural network metric learning can discriminate between classes, but has a problem in that it is unable to explain the relationship between the classes. Accordingly, there is a need for a technical scheme capable of solving such a problem.

SUMMARY

In order to solve the above problem, the present disclosure provides a method, a server, and a system for deep metric learning per hierarchical step of multi-labels and few-shot inference using the same, which can classify classes only with a small amount of data in an embedded device, and in particular, which can provide a Euclidean distance in an embedding space through a metric learning of a deep learning neural network so that the Euclidean distance has an actual meaningful distance.

However, problems to be solved by the present disclosure are not limited to the above-described problems, and other problems may exist.

In a first aspect of the present disclosure to solve the above problem, a method for deep metric learning per hierarchical step of multi-labels and few-shot inference using the same includes: sampling a plurality of N multiplets from a learning data set that is expressed by hierarchical multi-labels; configuring the N multiplets into triplets or quadruplets so as to correspond to the number of classes in each hierarchy; performing a metric learning per hierarchical step for a deep neural network model based on the configured triplets or quadruplets; and distributing, to an embedded device, the deep neural network model from which a loss function is removed as the metric learning is completed.

In a second aspect of the present disclosure, a server for performing deep metric learning per hierarchical step of multi-labels for a few-shot inference of an embedded device includes: a communication module configured to transmit and receive data to and from the embedded device; a memory configured to store a program for performing the deep metric learning per hierarchical step of the multi-labels; and a processor configured to: sample a plurality of N multiplets from a learning data set that is expressed by hierarchical multi-labels through execution of the program stored in the memory, configure the N multiplets into triplets or quadruplets so as to correspond to the number of classes in each hierarchy, and perform a metric learning per hierarchical step for a deep neural network model based on the configured triplets or quadruplets, and distribute, to the embedded device, the deep neural network model from which a loss function is removed as the metric learning is completed through the communication module.

In a third aspect of the present disclosure, a system for deep metric learning per hierarchical step of multi-labels and few-shot inference includes: a deep neural network metric learning server including a processor configured to: sample a plurality of N multiplets from a learning data set that is expressed by hierarchical multi-labels, configure the N multiplets into triplets or quadruplets so as to correspond to the number of classes in each hierarchy, perform a metric learning per hierarchical step for a deep neural network model based on the configured triplets or quadruplets, and distribute, to an embedded device, the deep neural network model from which a loss function is removed as the metric learning is completed; and an embedded device configured to perform the few-shot inference with respect to an input reference sample as a target through addition of a classifier to the deep neural network model as the deep neural network model is distributed.

In another aspect of the present disclosure to solve the above problem, a computer program executes a method for deep metric learning per hierarchical step of multi-labels and few-shot inference using the same in combination with a hardware computer, and is stored in a computer-readable recording medium.

Other detailed matters of the present disclosure are included in the detailed description and drawings.

According to an embodiment of the present disclosure described above, the embedding extracted from the respective samples through the deep metric learning per hierarchical step of multi-labels not only discriminates between the individual classes but also enables the distance between the classes to have the actual meaningful distance.

Through this, even in case that it is desired to apply completely new classes as recognition targets as needed on an embedded device operation site, it is possible to predict the characteristic of the class and to perform clustering between the classes having similar properties or to provide a systematic predicted value.

Effects of the present disclosure are not limited to those described above, and other unmentioned effects will be able to be clearly understood by those of ordinary skill in the art from the following description.

DETAILED DESCRIPTION

Figure 1:
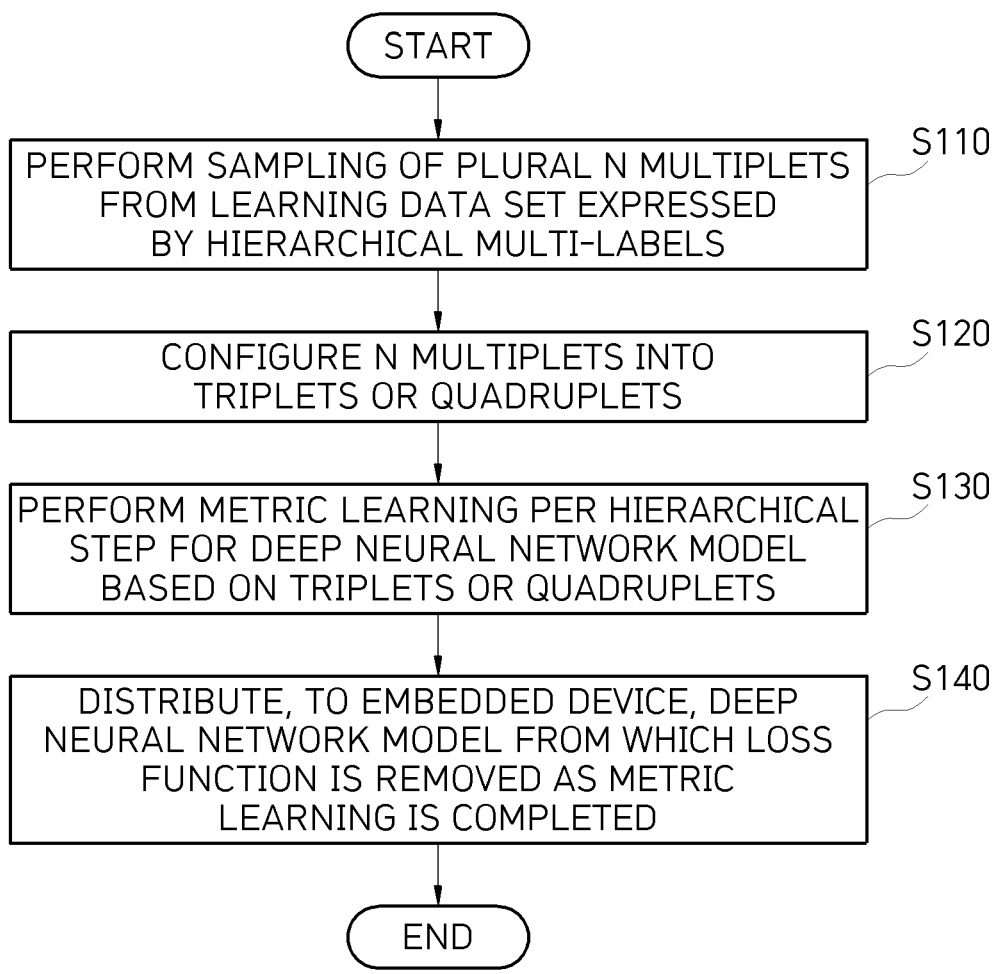
FIG. 1 is a flowchart of a method for deep neural network metric learning and few-shot inference according to an embodiment of the present disclosure.

The aspects and features of the present disclosure and methods for achieving the aspects and features will be apparent by referring to the embodiments to be described in detail with reference to the accompanying drawings. However, the present disclosure is not limited to the embodiments disclosed hereinafter, and it can be implemented in various different forms. However, the embodiments are provided to complete the present disclosure and to assist those of ordinary skill in the art in a comprehensive understanding of the scope of the technical idea, and the present disclosure is only defined by the scope of the appended claims.

Terms used in the description are to explain the embodiments, but are not intended to limit the present disclosure. In the description, unless specially described on the context, a singular form includes a plural form. In the description, the term "comprises" and/or "comprising" should be interpreted as not excluding the presence or addition of one or more other constituent elements in addition to the mentioned constituent elements. Throughout the whole description, the same reference numerals are used to indicate the same constituent elements, and the term "and/or" includes each of the mentioned constituent elements and all combinations of one or more thereof. The terms "first", "second", and so forth are used to describe various constituent elements, but these constituent elements should not be limited by the terms. The above-described terms are used only for the purpose of discriminating one constituent element from another constituent element. Accordingly, the first constituent element to be mentioned hereinafter may be the second constituent element in the technical idea of the present disclosure.

Unless otherwise defined, all terms (including technical and scientific terms) used in the description may be used as the meaning that can be commonly understood by those skilled in the art to which the present disclosure pertains. Further, unless clearly and specially defined, the terms defined in generally used dictionaries should not be interpreted ideally or excessively.

Hereinafter, to help understanding of those skilled in the art, backgrounds in which the present disclosure is proposed will be first described, and then, embodiments of the present disclosure will be described.

In order to classify classes only by a small number of reference embedded device, an embedding technique through a metric learning of a deep learning neural network may be used.

Mostly, although it is general that not only a feature extractor but also a classifier is composed of a neural network, utilization of the deep learning neural network in the embedded device is limited. The reason is as follows. First, it is difficult to learn a new class other than a fixed class. Second, even if it is possible to learn a new class, the weight value of the neural network is changed, and thus the recognition rate for the existing class is lowered. Third, even if a class that is not a learning target is input, it is intended to find a correct answer among learning targets, and thus it is vulnerable to an outlier. Due to the reason as above, it is useful to use an embedding technique for few-shot learning in the embedded device.

By gathering samples of the same class within a predetermined distance in an embedding space, the classes can be easily classified. As described above, learning of a neural network model so that a Euclidean distance between two samples in the embedding space represents a meaningful distance is called metric learning in a neural network.

The learning of the neural network model means updating of a weight value and a bias value of the neural network model so as to reduce a difference between an output value obtained by passing input data through the neural network and a correct answer of actual input data. In this case, an error between the correct answer and the neural network output value is called a loss, and the loss may mean a simple difference, but may be represented as a function of the difference, and this is called a loss function. The loss function for the metric learning is related to a distance between samples in the embedding space.

However, since the metric learning in the existing neural network concentrates upon the discrimination between the classes, the distance between the classes in the embedding space is actually unable to have a special meaning. For example, even if a feature vector located between class 1 and class 2 in the embedding space is extracted when certain unknown input data passes through the neural network, it is unable to be confirmed that the input data has the characteristic at a middle level between class 1 and class 2. But, it can be merely predicted which one of class 1 and class 2 the input data is closer to.

In other words, the embedding space obtained through the metric learning based on the existing neural network is able to discriminate between the classes, but is unable to explain the relationship between the classes. However, in case that the embedding technique in the embedded device is used for the few-shot learning and inference, a data set that is not included in the learning data set at all is applied in most cases.

That is, in the embedded device, due to the characteristic of the actual operating site, prediction is mostly required even with respect to a completely different class from the data set when the neural network is learned in a server or a cloud.

In this case, the embedding technique through the neural network metric learning has an advantage that it is easy to classify the classes with a small amount of data (hereinafter, few-shot). However, in the existing method, the location in the embedding space or the distance from another class does not completely represent the meaningful distance.

Accordingly, in order to solve such a problem, a method, a server 100, and a system 1 for deep metric learning per hierarchical step of multi-labels and few-shot inference using the same according to an embodiment of the present disclosure can provide a Euclidean distance in an embedding space so that the Euclidean distance has an actual meaningful distance by learning embedding in steps with respect to a data set that is expressed by multi-labels having a hierarchical structure.

Hereinafter, a method for deep metric learning per hierarchical step of multi-labels and few-shot inference using the same (hereinafter, deep neural network metric learning and few-shot inference method) according to an embodiment of the present disclosure will be described with reference to FIGS. 1 to 9.

Figure 2:
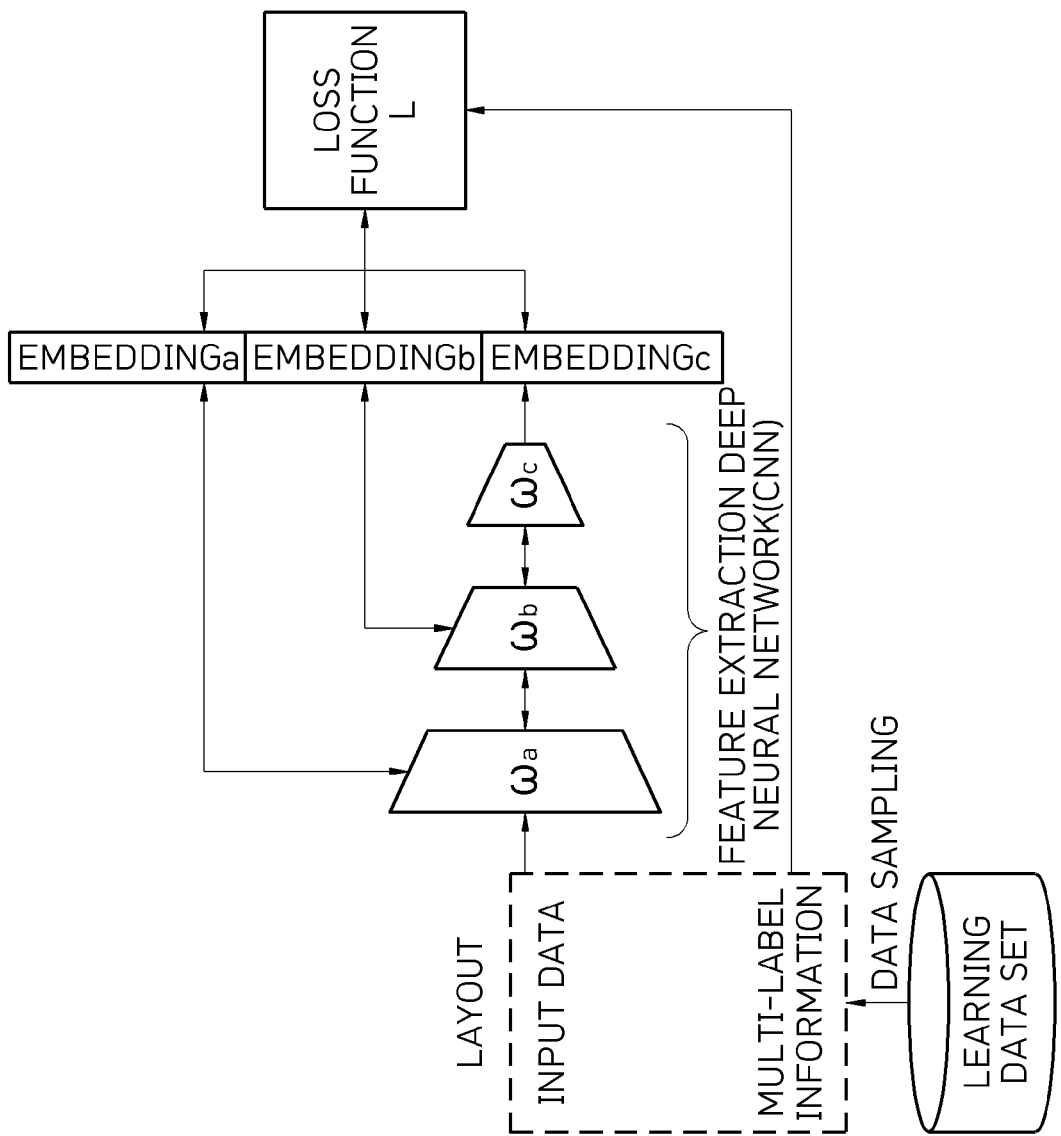
FIG. 2 is a diagram explaining an example of the structure of a deep neural network according to an embodiment of the present disclosure.

FIG. 1 is a flowchart of a method for deep neural network metric learning and few-shot inference according to an embodiment of the present disclosure. FIG. 2 is a diagram explaining an example of the structure of a deep neural network according to an embodiment of the present disclosure.

A deep neural network metric learning and few-shot inference method according to an embodiment of the present disclosure includes: sampling a plurality of N multiplets from a learning data set that is expressed by hierarchical multi-labels (S110); configuring the N multiplets into triplets or quadruplets so as to correspond to the number of classes in each hierarchy (S120); performing a metric learning per hierarchical step for a deep neural network model based on the configured triplets or quadruplets (S130); and distributing, to an embedded device 200, the deep neural network model from which a loss function is removed as the metric learning is completed(S140).

Meanwhile, the steps illustrated in FIG. 1 may be understood to be performed by a server 100 or a system 1 for deep metric learning per hierarchical step of multi-labels to be described later, but performing of the steps is not certainly limited thereto.

An example of deep metric learning per hierarchical step of multi-labels according to an embodiment of the present disclosure is illustrated in FIG. 2. In this case, a label structure composed of three hierarchies is assumed in FIG. 2, but an embodiment of the present disclosure is not limited thereto, and the number of hierarchies is sufficiently expandable.

The metric learning for extracting hierarchical features utilizes triplet and quadruplet loss functions.

First, the server 100 performs sampling of a plurality of N multiplets from a learning data set that is expressed by hierarchical multi-labels in a learning database (S110). Here, the N multiplets mean configuration of N different samples in a learning data set. For example, if one reference sample is randomly selected, total N samples are used as one tuple by selecting one positive sample in the same class and (N-2) negative samples in a different class in accordance with appropriate standards.

Further, the multi-labels mean that one object is expressed by several label correct answers. Also, the hierarchical label means a label structure in which an upper label includes lower labels.

After the server 100 configures the N multiplets, the plurality of N multiplets are tied into one batch to be used for once learning. In case of only two classes on the corresponding hierarchy, the metric learning is performed with a triplet composed of a reference sample, a positive sample, and a negative sample. Unlike this, in case of three or more classes on the corresponding hierarchy, the metric learning is performed with a quadruplet composed of a reference sample, a positive sample, a first negative sample, and a second negative sample.

In the metric learning, data sampling is very important as compared with the general deep neural network learning. The general deep neural network learning is performed in a state where data is randomly mixed, and then is divided in sequence by layout sizes. In contrast, the metric learning is performed in a state where a predetermined number (e.g., 4 in case of the quadruplet) of samples are randomly chosen to match their standards, and then is divided by layout sizes.

According to an embodiment of the disclosure, the metric learning passes through a more complicated sampling process as compared with a case where all labels are in independent and fair relationships. As an embodiment, detailed conditions of the sampling for each hierarchy are as follows.

Condition (1): The complete positive sample is a sample having the same label as that of a reference sample.

Condition (2): The complete negative sample is a sample having a different label from that of a reference sample in each hierarchy.

Condition (3): All negative samples are composed of samples having different classes from the class of the reference sample in the lowermost hierarchy.

Condition (4): Partial negative samples are composed of cluster samples that are different from the complete negative samples in each hierarchy.

In this case, according to condition (2) to condition (4), in a multi-label structure generalized and composed of r hierarchies, $2^{r-1}$ negative samples including all of the complete negative samples and partial negative samples are presented. This is because the number of cases in the remaining upper hierarchies (i.e., r-1) excluding the lowermost hierarchy is two of positive or negative ones. In this case, since the lowermost hierarch is certainly negative, the number of cases is 1.

In case of the multi-labels composed of three hierarchies as in FIG. 2, total four kinds of negative samples may be considered in accordance with the above sampling conditions. Accordingly, the layout may be configured by sampling hexaplet as follows.

① Reference sample
② Complete positive sample (for all hierarchies)
③ Complete negative sample (for all hierarchies)
④ Partial negative sample (for the first layer)
⑤ Partial negative sample (for the first layer and the second layer)
⑥ Partial negative sample (for the first layer and the third layer)

Next, the server 100 configures the N multiplets into triplets or quadruplets so as to correspond to the number of classes in each hierarchy (S120). That is, in case of the above-described example, the triplet or the quadruplet are obtained from the hexaplet in accordance with the number of classes on each hierarchy, and then, based on this, the metric learning is performed. For convenience in explanation, a data set composed of hierarchical labels as in FIG. 3 is assumed.

Figure 3:
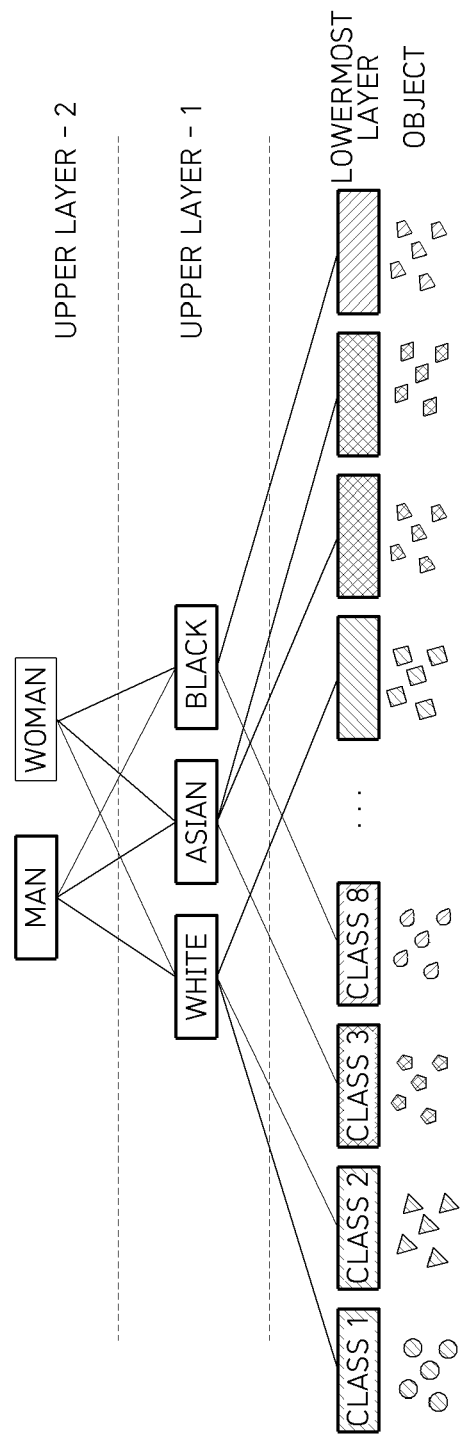
FIG. 3 is a diagram illustrating an example of a hierarchical label based data set according to an embodiment of the present disclosure.
Figure 4:
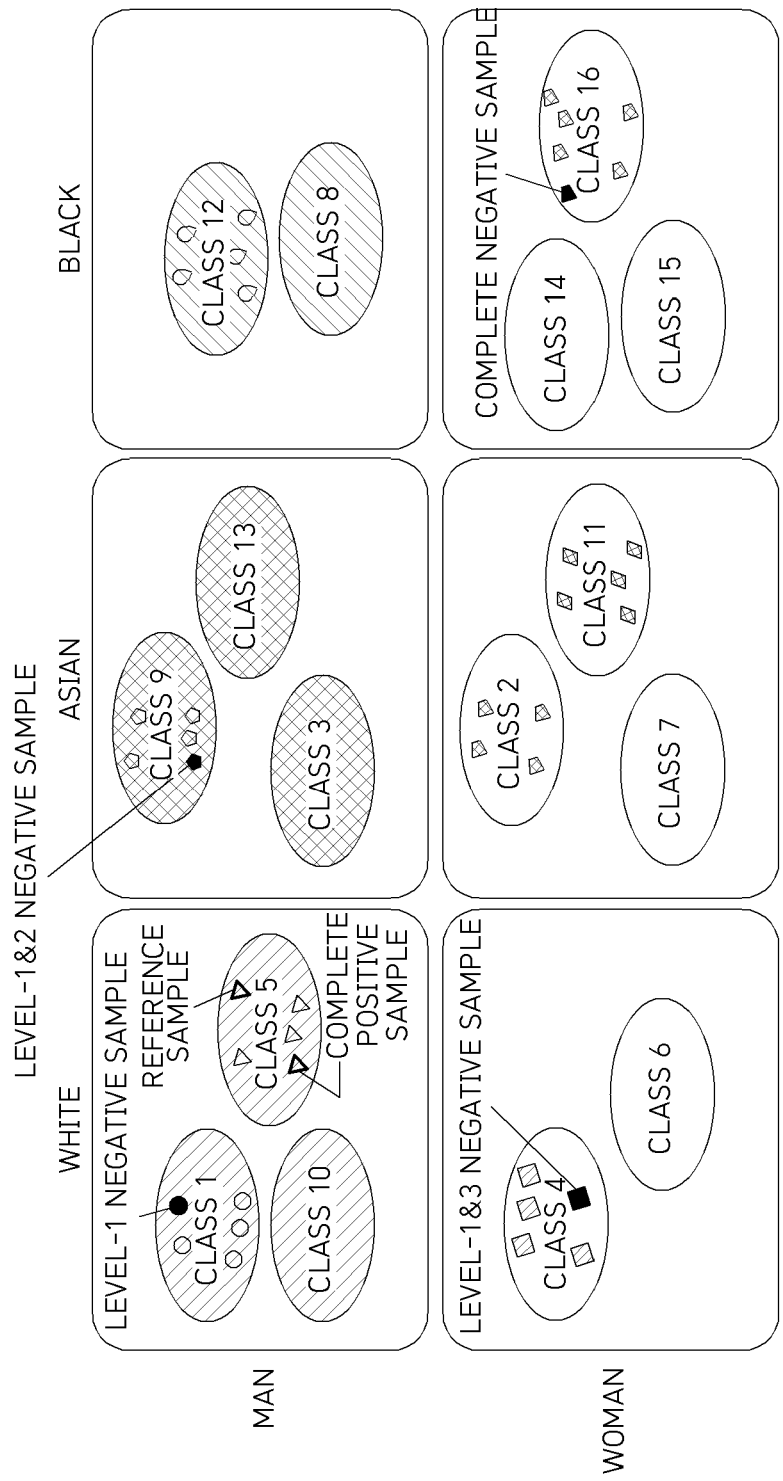
FIG. 4 is a diagram illustrating an example in which a hexaplet is sampled in a hierarchical label structure of FIG. 3.

FIG. 3 is a diagram illustrating an example of a hierarchical label based data set according to an embodiment of the present disclosure. FIG. 4 is a diagram illustrating an example in which a hexaplet is sampled in a hierarchical label structure of FIG. 3.

As an example, as illustrated in FIG. 4, if a sample belonging to {man, white, class 5} is selected as a reference sample, the complete positive sample is selected as another object of class 5. Since this positive sample has the multi-labels of {man, white, class 5}, condition (1) is satisfied.

Next, the complete negative sample should have a different label from that of the reference sample on all hierarchies in accordance with condition (2). Accordingly, as illustrated in FIG. 4, a sample belonging to {woman, black, class 16} may be selected. Of course, there are many other options. For example, {woman, Asian, class 11} may be selected.

Next, the partial negative sample may be selected to match each condition. As illustrated in FIG. 4, the partial negative sample for the lowermost hierarchy (level-1) may be chosen from {man, white, class 1}, the partial negative sample for level-1 & 2 may be chosen from {man, Asian, class 12}, and the partial negative sample for level-1 & 3 may be chosen from {woman, white, class 4}.

In this case, it is to be noted that since the complete negative sample already has the "black" label, it is unable to choose the level-1 & 2 negative sample from the same class as {man, black, class 12}. This is because two negative samples on hierarchy 2 should belong to different clusters in order to configure the quadruplet.

After sampling the hexaplet as described above, the triplet or the quadruplet is taken for each hierarchy for the metric learning.

In this case, in case of three or more classes of the corresponding hierarchy, it is possible to configure a quadruplet including a reference sample having a certain class, a positive sample having the same class as that of the reference sample, a first negative sample having a different class from that of the reference sample, and a second negative sample having a different class from that of the reference sample and the first negative sample.

Further, in case of two classes of the corresponding hierarchy, it is possible to configure a triplet including a reference sample having a certain class, a positive sample having the same class as that of the reference sample, and a negative sample having a different class from that of the reference sample.

Accordingly, in case of performing the sampling as illustrated in FIG. 4, the first layer may configure a quadruplet with a reference sample, a positive sample, a level-1 negative sample, and a complete negative sample. Further, the second layer may configure a quadruplet with a reference sample, a positive sample, level-1 & 2 negative samples, and a complete negative sample.

Further, since the third layer has only two classes, it is not possible to configure the quadruplet. Accordingly, the triplet is configured, but the negative sample that is closer to the reference sample may be selected among level-1 & 3 negative samples, and a complete negative sample.

As described above, if configuration of the triplet or quadruplet is completed based on the N multiplet, the server 100 performs the metric learning for each hierarchy for the deep neural network model based on the configured triplet or quadruplet (S130).

Figure 5:
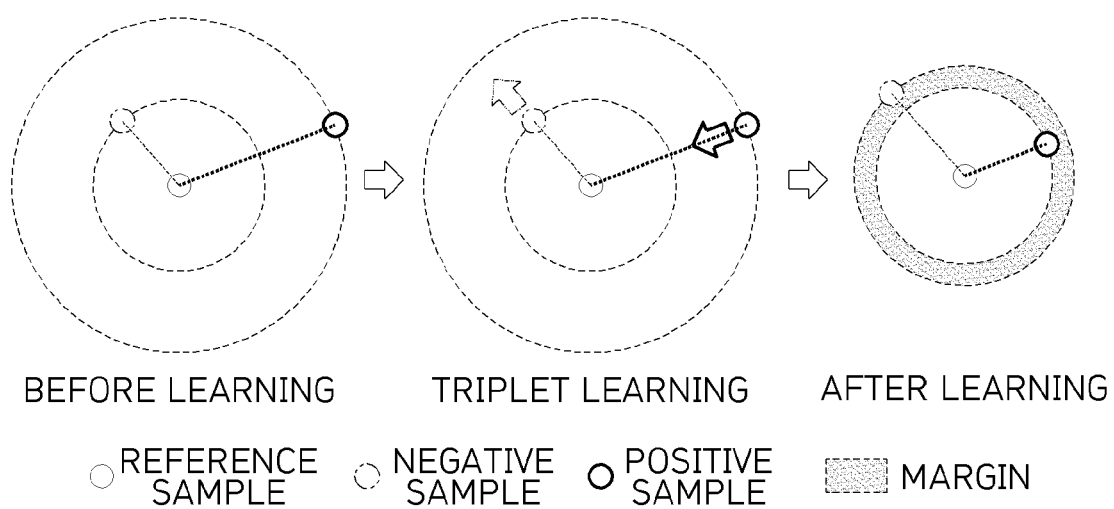
FIG. 5 is a diagram explaining the contents in which a metric learning is performed based on a triplet.

FIG. 5 is a diagram explaining the contents in which a metric learning is performed based on a triplet.

First, if a triplet including a reference sample, a positive sample, and a negative sample is configured, the relationship between the triplets of the samples is defined as in the following Equation 1.

$$d(f(x_{anc}),f(x_{pos}))+\alpha<d(f(x_{anc}),f(x_{neg1}))$$ [Equation 1]

In this case, in Equation 1, a means a first margin value, and a function d(a, b) means a Euclidean distance between vector a and vector b. Further, f(*) means forward propagation of the neural network, and outputs a feature extraction vector for an input *. Further, $x_{anc}$, $x_{pos}$, and $x_{neg1}$ are input data sampled in a learning database, and mean a reference sample, a positive sample, and a negative sample-1, respectively.

In this case, the negative sample-1 basically means a partial negative sample on each hierarchy. Accordingly, it becomes level-1 negative sample on the first layer, and becomes level 1 & 2 negative sample on the second layer. However, in case that only two classes are configured as on the third layer of FIG. 3, and the quadruplet is unable to be configured, one of the complete negative sample and the partial negative sample, which is closer to the reference sample, is selected. That is, one of level-1 & 3 negative samples and the complete negative sample, which is closer to the reference sample, is selected as the negative sample-1.

According to more intuitive explanation of Equation 1 as described above, through a sine-wave propagation operation of the deep neural network model, the metric learning is performed so that the Euclidian distance is located relatively closer for the positive sample in the same class with respect to the reference sample of the configured triplet, and the Euclidian distance is located relatively farther away for the negative sample in a different class from the class of the reference sample with respect to the reference sample. In this case, the metric learning is performed so that the positive sample is located closer to the reference sample as much as a first predetermined margin value a rather than the minimum negative sample.

Figure 6:
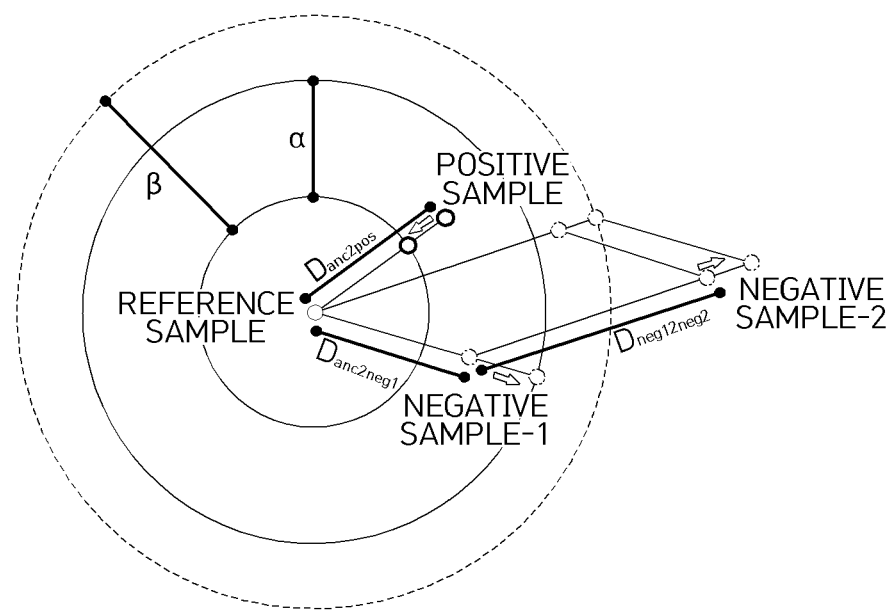
FIG. 6 is a diagram explaining the contents in which a metric learning is performed based on a quadruplet.

FIG. 6 is a diagram explaining the contents in which a metric learning is performed based on a quadruplet.

The metric learning of the quadruplet is aimed at the result as shown in FIG. 6 in addition to the metric learning of the triplet as above. In this case, negative sample-2 in FIG. 6 means a complete negative sample. However, on the hierarchy composed of the triplet, negative sample-2 does not exist separately.

First, the relationship for the quadruplet of a reference sample, a positive sample, a negative sample-1, and a negative sample-2 is defined as in Equation 2 below.

$$d(f(x_{anc}),f(x_{pos})+\beta<d(f(x_{neg1}),f(x_{neg2}))$$ [Equation 2]

Here, β is a second margin value, and should satisfy the relationship of Equation 3 below. That is, the second margin value is set to be smaller than the first margin value.

$$\alpha>\beta$$ [Equation 3]

With reference to Equation 2 as above, through a sine-wave propagation operation of the deep neural network model, the metric learning is performed so that the Euclidian distance is located relatively closer for the positive sample in the same class with respect to the reference sample of the configured triplet, and the Euclidian distance is located relatively farther away for the first and second negative samples having a different class from the class of the reference sample. Accordingly, the metric learning is performed so that the Euclidian distance between the first negative sample and the second negative sample is located relatively farther away. That is, the distance between the different classes is sufficiently lowered, and the samples of the same class converge in a direction in which they are gathered at one point.

In this case, the metric learning is performed so that the value obtained by adding the Euclidian distance value of the positive sample for the reference sample to the second predetermined margin value becomes smaller than the Euclidian distance value between the first and second negative samples.

Meanwhile, since Equation 1 considers only the relative distance, the distribution of samples per class by the final learning result may not be constant. However, by adding the condition of Equation 2, the sample distribution may be formed to be close to a circle shape. That is, an effect can be expected, in which the difference between the classes is made bigger, and the difference between the respective samples in the class is made smaller. Such results are very useful later in applying and expanding the embedding for new classes having never been learned.

Further, in an embodiment of the present disclosure, a quadruplet loss function is defined to perform the metric learning so as to satisfy the condition of Equation 1 and Equation 2 in the deep learning based deep neural network model. First, after a general quadruplet loss function is explained, a loss function defined in an embodiment of the present disclosure will be described in detail.

Figure 7:
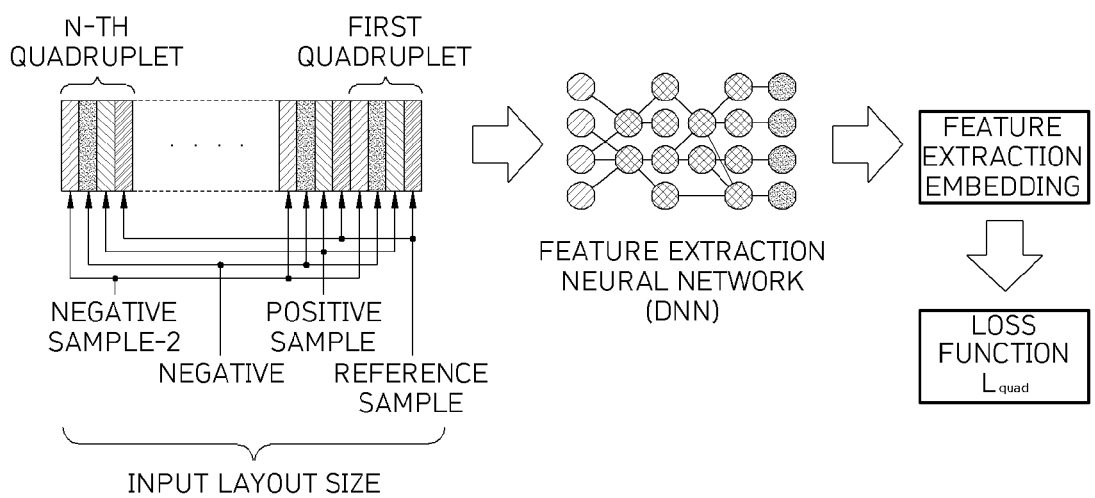
FIG. 7 is a diagram illustrating an example in which a layout is configured by sampling a quadruplet.

FIG. 7 is a diagram illustrating an example in which a layout is configured by sampling a quadruplet.

The loss function for the triplet and the quadruplet has already been widely known. In this case, since the loss function for the triplet is included in the quadruplet, separate explanation thereof will be omitted.

As illustrated in FIG. 7, in case of configuring the layout with N quadruplets, the loss function $L_{quad}$ of the quadruplets is defined as in the following equation.

$$L_{quad} = \sum_{i,j,k}^{N} \{d(y_i, y_j)^2 - d(y_i, y_k)^2 + \alpha\} + $$

$$\sum_{i,j,k,l}^{N} \{d(y_i, y_j)^2 - d(y_k, y_l)^2 + \beta\} =$$

$$\sum_{i,j,k}^{N} \{\|y_i - y_j\|_2^2 - \|y_i - y_k\|_2^2 + \alpha\} + $$

$$\sum_{i,j,k,l}^{N} \{\|y_i - y_j\|_2^2 - \|y_k - y_l\|_2^2 + \beta\}$$

[Equation 4]

In Equation 4 as above, y is a feature vector extracted by passing through the neural network f(*) with respect to an input sample x. Further, i, j, k, and l indicate a reference sample, a positive sample, a negative sample-1, and a negative sample-2, respectively, in the layout, and N samples exist in one layout.

Based on Equation 4 as above, a loss function for one quadruplet set according to an embodiment of the present disclosure is as in Equation 5 below.

$$L_{quad} = \max(0, \|y_{anc} - y_{pos}\|_2^2 - \|y_{anc} - y_{neg1}\|_2^2 + \alpha) + \max(0, \|y_{anc} - y_{pos}\|_2^2 - \|y_{neg1} - y_{neg2}\|_2^2 + \beta)$$

[Equation 5]

Meanwhile, the metric learning for the quadruplet may be performed through a stochastic gradient descent (SGD) technique.

Figure 8:
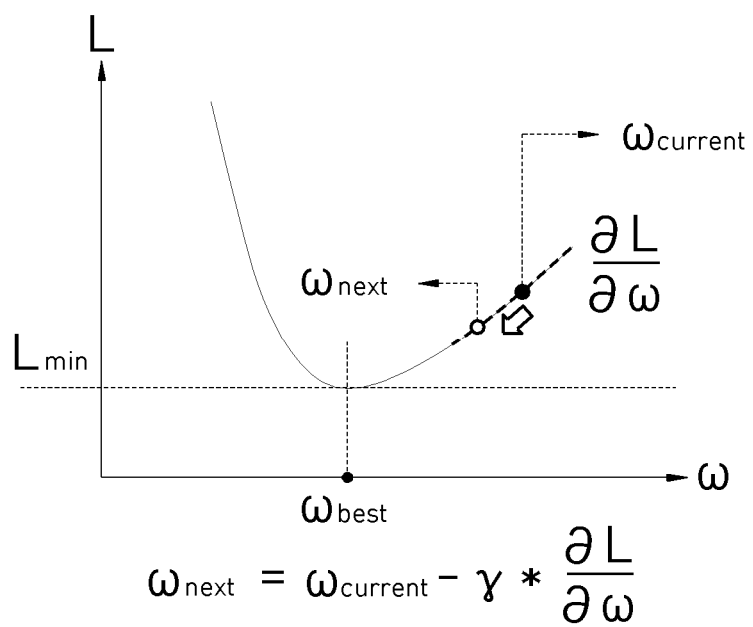
FIG. 8 is a diagram explaining a stochastic gradient descent technique.

FIG. 8 is a diagram explaining a stochastic gradient descent technique.

The stochastic gradient descent technique obtains a difference (loss) between the result (predicted value) having passed through the neural network and a correct answer, and finds an optimum point while updating parameters of the neural network through obtaining of a backward(descent) slope (gradient) of the calculated loss. By illustrating a loss function for one ingredient through simplification of the loss function, it is possible to depict the stochastic gradient descent technique as in FIG. 8. That is, by moving little by little in backward direction along a graph as much as a value that is proportional to the value obtained by partially differentiating the corresponding gradient with respect to the loss function, the method approaches the optimum gradient value having the minimum loss value. Here, γ is a constant representing how much to move, and is a hyper parameter that is usually called a learning rate.

The hyper parameter is not a calculated value that is mathematically proved, but means a value optionally determined through the experience of various experiments by experts. Mostly, it is general that the learning rate is initially set high, and is set low as the optimum point becomes close. If the learning rate is set too low, too much time is required to find the optimum point, whereas if the learning rate is set too high, the learning rate passes by the optimum point, thereby an appropriate value should be set.

In an embodiment of the present disclosure, the metric learning is dividedly performed by hierarchies. That is, the server 100 may calculate the loss function by hierarchies by performing the metric learning by hierarchies of the deep neural network model, and may calculate the total loss functions through a weighted sum of the loss functions by hierarchies. In this case, the total loss function is as in the following Equation 6.

$$\mathcal{L} = \sum_{i=1}^{H} \mathcal{H}_i L_i$$

[Equation 6]

In the above-described example like FIG. 4, the loss functions of respective layers based on Equation 6 above are represented as in the following Equation 7.

$$L_1 = L_{quad} = \max(0, \|y_{anc} - y_{pos}\|_2^2 - \|y_{anc} - y_{neg_{LV1}}\|_2^2 + \alpha_1) + \max(0, \|y_{anc} - y_{pos}\|_2^2 - \|y_{neg_{LV1}} - y_{neg_{FULL}}\|_2^2 + \beta_1)$$
$$L_2 = L_{quad} = \max(0, \|y_{anc} - y_{pos}\|_2^2 - \|y_{anc} - y_{neg_{LV12}}\|_2^2 + \alpha_2) + \max(0, \|y_{anc} - y_{pos}\|_2^2 - \|y_{neg_{LV12}} - y_{neg_{FULL}}\|_2^2 + \beta_2)$$
$$L_3 = L_{tri} = \max(0, \|y_{anc} - y_{pos}\|_2^2 - \|y_{anc} - y_{neg_{short}}\|_2^2 + \alpha_3)$$

[Equation 7]

In Equation 7 above, $y_{anc}$, $y_{pos}$, $y_{neg_{LV1}}$, $y_{neg_{LV12}}$, $y_{neg_{LV13}}$, and $y_{neg_{FULL}}$ mean embedding outputs when a reference sample, a positive sample, level-1 negative sample, level-1 & 2 negative sample, level-1 & 3 negative sample, and a complete negative sample pass through the feature extraction neural network in order. Further, $y_{neg_{short}}$ means a closer one to $y_{anc}$ between $y_{neg_{LV13}}$ and $y_{neg_{FULL}}$.

In this case, the loss function for the metric learning per hierarchical step may be represented as in Equation 8 below.

$$\mathcal{L} = \kappa_1 L_1 + \kappa_2 L_2 + \kappa_3 L_3$$

[Equation 8]

In this case, in Equation 8, $\kappa_1$ is a weight constant for a hierarchical loss, and is a hyper parameter that is determined according to a task.

If the loss function is calculated, the server 100 updates the weight value and the bias of the deep neural network model through back propagation of the deep neural network model.

In this case, the server 100 measures the accuracy of the current deep neural network model based on a K-nearest neighbors (KNN) algorithm, and if the measured accuracy satisfies the predetermined accuracy (sufficient accuracy), the server ends the metric learning of the deep neural network model.

If the learning is ended, the server 100 stores the weight value and the bias of the deep neural network model as model information.

Referring again to FIG. 1, as the metric learning is completed, the server 100 distributes the deep neural network model from which the loss function is removed to the embedded device 200 (S140). That is, when distributing the deep neural network model to the embedded device 200, the server 100 distributes the deep neural network model after fixing the weight value and the bias to the model values.

Figure 9:
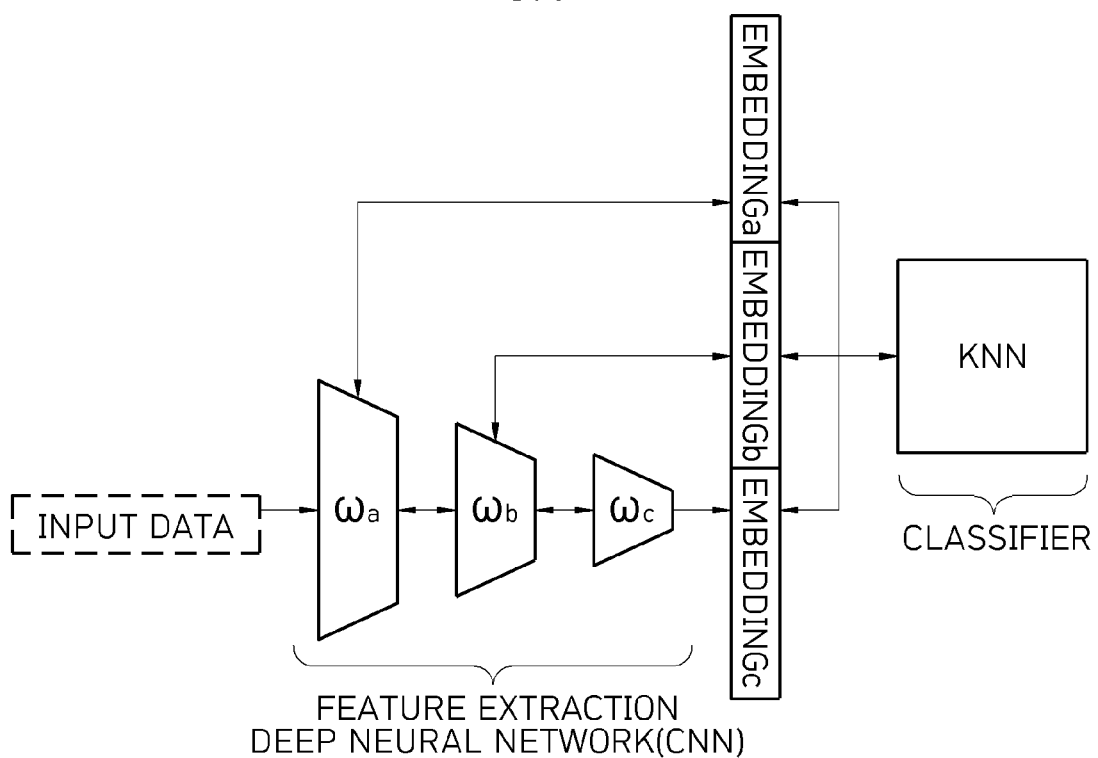
FIG. 9 is a diagram explaining a deep neural network model distributed to an embedded device.

FIG. 9 is a diagram explaining a deep neural network model distributed to an embedded device 200.

The embedded device 200 may obtain the embedding of classes to be inferred through the few-shot learning by adding a classifier to the deep neural network model distributed by the server 100. In this case, in case of reference samples (M reference samples) having a specific number (N) of classes, total N*M embedding may be obtained. Accordingly, the embedded device 200 may just store only the embedding results in text or binary form instead of input data that occupies lots of storage.

Meanwhile, the specific number (N) of classes may be classes that are not used for the neural network metric learning by the server 100. That is, in most cases, data that matches the situation exists on the operating site of the embedded device 200, there may be many cases where the embedding is obtained only by the classes that are not actually used at all for the learning.

The classifier is added to the location of the removed loss function in FIG. 2. Since the learning has been performed through the metric learning in the server 100 so that the Euclidian distance in the embedding space has the meaningful distance, the classifier may use the KNN algorithm that is the distance based class classification algorithm.

Meanwhile, the following three cases may be considered in operating the embedded device 200.

Case 1) Selection of One of Reference Samples in Advance

By passing the reference sample having a specific number of classes through the deep neural network model added to the embedded device 200, it is possible to project one point in the embedding space. In this case, the class classification is possible only by the embedding of the lowermost layer.

Next, K output samples for (N*M) reference samples already embedded around a feature vector of the reference sample are detected through the classifier. Further, which class most of the detected K output samples belong to by the majority vote is provided as the result of the few-shot inference.

Case 2) Further Extension of New Classes

The result of passing M reference samples having new classes through the deep neural network model added to the embedded device 200 is added to the embedding. Thereafter, the class classification is performed in the same manner as case 1. In this case, the characteristic of the classes can be estimated by analyzing the embedding per hierarchy that is one of advantages of the present disclosure.

Case 3) Outlier Dismissal

In an embodiment of the present disclosure, if the reference sample that does not belong to the class in the learning data set is input to the deep neural network model of the embedded device 200, such an input may be dismissed. That is, unlike case 1, one of the classes embedded in advance unconditionally by the majority vote is not inferred, and if the Euclidian distance in the average value of the reference sample for the class to which the reference sample does not belong exceeds a predetermine threshold value, it is determined that the reference sample does not belong to the corresponding class, and the corresponding reference sample is determined as the outlier to be dismissed.

Unlike the existing method, an embodiment of the present disclosure has an advantage that if an object having a completely new class that is not the class used for the learning as in case 2 and case 3 is input, it is possible to predict the characteristic of the input object by grasping which of upper class categories the object belongs to by analyzing the location of the embedding per hierarchy.

With reference to the examples of FIGS. 2 and 3, it is assumed that two new persons are entered as an input of the device 200 in three hierarchies composed of embedded device 200 man/woman, white/Asian/black, and individual person's names.

In this case, in the existing method, the two new persons may be discriminated by classes included in the learning data set. However, in the embedding space, the distance between the new classes or the distance from another class does not give any specific meaning. For example, even if the two classes are closer to each other than other classes in the embedding space, they may have completely different characteristics, such as man and woman, and the classes, such as the same men, may rather be farther away from each other.

However, according to an embodiment of the present disclosure, through the embedding per hierarchical step, it can be provided as the few-shot inference result that the two new classes are all men, and one is shown as a white, and the other is shown as an Asian.

Figure 10:
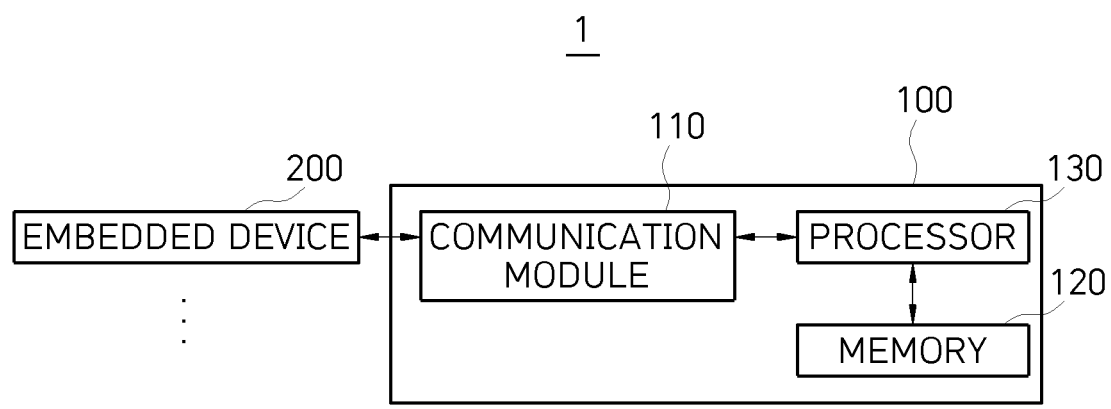
FIG. 10 is a block diagram of a server and a system for deep metric learning per hierarchical step of multi-labels according to an embodiment of the present disclosure.

Meanwhile, as described above, according to implementation examples of the present disclosure, steps S110 to S140 may be further divided into additional steps, or may be combined into smaller steps. Further, as needed, some steps may be omitted, or the order of the steps may be changed. In addition, the contents of FIGS. 1 to 9, including even the other omitted contents, can be applied to a system 1 and a server 100 of FIG. 10.

Hereinafter, a server 100 and a system 1 for deep metric learning per hierarchical step of multi-labels according to an embodiment of the present disclosure will be described.

The system 1 according to an embodiment of the present disclosure includes a deep neural network metric learning server 100 and at least one embedded device 200.

The server 100 is configured to include a communication module 110, a memory 120, and a processor 130. The communication module 110 transmits and receives data to and from the embedded device 200, and in the memory 120, a program for performing deep metric learning per hierarchical step of multi-labels is stored.

The processor 130 performs sampling of a plurality of N multiplets from a learning data set that is expressed by hierarchical multi-labels through execution of the program stored in the memory 120, configures the N multiplets into triplets or quadruplets so as to correspond to the number of classes in each hierarchy, and perform a metric learning per hierarchical step for a deep neural network model based on the configured triplets or quadruplets. Further, the processor 130 distributes, to the embedded device 200, the deep neural network model from which a loss function i removed as the metric learning is completed.

The embedded device 200 performs the few-shot inference with respect to an input reference sample as a target through addition of a classifier to the deep neural network model as the deep neural network model is distributed.

An embodiment of the present disclosure as described above may be implemented as a program (or application) to be executed in combination with a hardware computer, and may be stored in a medium.

In order for the computer to read the above described program so as to execute the above methods implemented by the program, the program may include a code coded by a computer language, such as C, C++, JAVA, Ruby, and machine language, which can be read by a processor (CPU) of the computer through a device interface of the computer. Such a code may include a functional code related to a function that defines functions necessary to execute the above methods, and may include a control code related to an execution procedure necessary for the processor of the computer to execute the above functions according to a specific procedure.

Further, such a code may further include additional information necessary for the processor of the computer to execute the above functions or a memory reference related code regarding at which location (address) of an internal or external memory of the computer the medium is to be referred to. Further, in case that the processor of the computer is required to communicate with any other remote computer or server to execute the above functions, the code may further include a communication related code regarding how to communicate with any other remote computer or server by using a communication module of the computer, or which information or medium is to be transmitted/received during the communication.

The storage medium means a medium which semi-permanently stores data and which can be read by a device, rather than a medium which stores data for a brief moment, such as a register, cache, or memory. Specific examples of the storage medium include ROM, RAM, CD-ROM, magnetic tape, floppy disc, and optical data storage device, but the present disclosure is not limited thereto. That is, the program may be stored in various recording media on various servers that can be accessed by the computer, or various recording medium on a user's computer. Further, the medium may be distributed in a computer system connected through a network, and may store a code that can be read by the computer in a distributed manner.

The above explanation of the present disclosure is for illustrative purposes, and it can be understood by those of ordinary skill in the art to which the present disclosure pertains that the present disclosure can be easily modified in other specific forms without changing the technical idea or essential features of the present disclosure. Accordingly, it should be understood that the above-described embodiments are illustrative in all aspects, not restrictive. For example, each constituent element explained as a single type may be distributed and carried out, and in the same manner, constituent elements explained as being distributed may be carried out in a combined form.

The scope of the present disclosure is defined by the appended claims to be described later rather than the above-described detailed description, and all changes or modifications derived from the meanings, scope, and equivalent concept of the claims should be interpreted as being included in the scope of the present disclosure.

What is claimed is:

1. A method for deep metric learning per hierarchical step of multi-labels and few-shot inference using the same, being performed by a computer, the method comprising:
    sampling a plurality of N multiplets from a learning data set that is expressed by hierarchical multi-labels;
    configuring the N multiplets into triplets or quadruplets so as to correspond to the number of classes in each hierarchy;
    performing a metric learning per hierarchical step for a deep neural network model based on the configured triplets and quadruplets; and
    distributing, to an embedded device, the deep neural network model from which a loss function is removed as the metric learning is completed.

2. The method of claim 1, wherein the sampling of the plurality of N multiplets from the learning data set that is expressed by the hierarchical multi-labels comprises:
    configuring a complete positive sample with a sample having the same label as that of a reference sample;
    configuring a complete negative sample to a sample having a different label from that of the reference sample on each hierarchy;
    configuring all negative samples to samples having different classes from those of the reference sample on a lowermost hierarchy; and
    configuring some negative samples to cluster samples different from the complete negative sample on each hierarchy.

3. The method of claim 2, wherein the configuring of the N multiplets into the triplets or the quadruplets so as to correspond to the number of the classes in each hierarchy comprises:
    in case of two classes of the corresponding hierarchy, configuring a triplet including a reference sample having a certain class, a positive sample having the same class as that of the reference sample, and a negative sample having a different class from that of the reference sample.

4. The method of claim 3, wherein the performing of the metric learning per hierarchical step for the deep neural network model based on the configured triplets or quadruplets comprises:
    performing the metric learning through a forward propagation operation of the deep neural network model so that a Euclidian distance is relatively closer for the positive sample with respect to the reference sample, and the Euclidian distance is relatively farther away for the negative sample with respect to the reference sample among the configured triplets.

5. The method of claim 4, wherein the performing of the metric learning per hierarchical step for the deep neural network model based on the configured triplets or quadruplets comprises:
    performing the metric learning so that the positive sample is located closer to the reference sample than the negative sample as much as a first predetermined margin value or more.

6. The method of claim 2, wherein the configuring of the N multiplets into the triplets or the quadruplets so as to correspond to the number of the classes in each hierarchy comprises:
    in case of three or more classes of the corresponding hierarchy, configuring a quadruplet including a reference sample having a certain class, a positive sample having the same class as that of the reference sample, a first negative sample having a different class from that of the reference sample, and a second negative sample having a different class from that of the reference sample and the first negative sample.

7. The method of claim 6, wherein the performing of the metric learning per hierarchical step for the deep neural network model based on the configured triplets or quadruplets comprises:
    performing the metric learning through a forward propagation operation of the deep neural network model so that a Euclidian distance is relatively closer for the positive sample with reference to the reference sample, and the Euclidian distance between the first negative sample and the second negative sample is relatively farther away with respect to the reference sample among the configured quadruplets.

8. The method of claim 7, wherein the performing of the metric learning per hierarchical step for the deep neural network model based on the configured triplets or quadruplets comprises:

performing the metric learning so that a value obtained by adding a Euclid distance value of the positive sample for the reference sample to a second predetermined margin value becomes smaller than a Euclid distance value between the first and second negative samples.

9. The method of claim 2, wherein the performing of the metric learning per hierarchical step for the deep neural network model based on the configured triplets or quadruplets comprises:
calculating a loss function per hierarchical step by performing the metric learning per the hierarchical step of the deep neural network model; and
calculating entire loss functions through a weighted sum of the loss function per the hierarchical step.

10. The method of claim 9, wherein the performing of the metric learning per hierarchical step for the deep neural network model based on the configured triplets or quadruplets comprises:
updating a weight value and a bias of the deep neural network model through a backward propagation operation of the deep neural network model;
measuring an accuracy of the current deep neural network model based on a KNN algorithm every specific period;
ending the metric learning of the deep neural network model in case that the measured accuracy satisfies a predetermined accuracy; and
storing the weight value and the bias of the deep neural network model that satisfies the predetermined accuracy as model information.

11. The method of claim 1, further comprising:
adding a classifier to the distributed deep neural network model through the embedded device;
inputting a reference sample having a predetermined number of classes to the added deep neural network model;
detecting an output sample for an embedded reference sample through the classifier as an output against an input of the deep neural network model; and
obtaining a class for the output sample through the classifier as the result of few-shot inference.

12. The method of claim 11, wherein the inputting of the reference sample having the predetermined number of classes to the added deep neural network model comprises:
additionally expanding a new class by inputting the reference sample having the new class to the added deep neural network model.

13. The method of claim 11, wherein in case that the reference sample that does not belong to the class in the learning data set is input to the deep neural network model, the obtaining of the class for the output sample through the classifier as the result of the few-shot inference comprises:
in case that a Euclidian distance at an average value of the reference sample for the class to which the reference sample does not belong exceeds a predetermined threshold value, determining that the reference sample is an outlier and dismissing the reference sample by discriminating that the Euclidian distance does not belong to the corresponding class.

14. A server for performing deep metric learning per hierarchical step of multi-labels for a few-shot inference of an embedded device, the server comprising:
a communication module configured to transmit and receive data to and from the embedded device;
a memory configured to store a program for performing the deep metric learning per hierarchical step of the multi-labels; and
a processor configured to: sample a plurality of N multiplets from a learning data set that is expressed by hierarchical multi-labels through execution of the program stored in the memory, configure the N multiplets into triplets or quadruplets so as to correspond to the number of classes in each hierarchy, and perform a metric learning per hierarchical step for a deep neural network model based on the configured triplets or quadruplets, and distribute, to the embedded device, the deep neural network model from which a loss function is removed as the metric learning is completed through the communication module.

15. A system for deep metric learning per hierarchical step of multi-labels and few-shot inference, the system comprising:
a deep neural network metric learning server including a processor configured to: sample a plurality of N multiplets from a learning data set that is expressed by hierarchical multi-labels, configure the N multiplets into triplets or quadruplets so as to correspond to the number of classes in each hierarchy, perform a metric learning per hierarchical step for a deep neural network model based on the configured triplets or quadruplets, and distribute, to an embedded device, the deep neural network model from which a loss function is removed as the metric learning is completed; and
an embedded device configured to perform the few-shot inference with respect to an input reference sample as a target through addition of a classifier to the deep neural network model as the deep neural network model is distributed.

16. The system of claim 15, wherein the embedded device is configured to: input a reference sample having a predetermined number of classes to the added deep neural network model, detect an output sample for an embedded reference sample as an output against an input of the deep neural network model, and then obtain a class for the output sample through the classifier as the result of few-shot inference.

17. The system of claim 16, wherein the embedded device is configured to additionally expand new classes by inputting the reference sample having the predetermined number of the new classes to the added deep neural network model.

18. The system of claim 16, wherein if the reference sample that does not belong to the class in the learning data set is input to the deep neural network model, the embedded device is configured to determine that the reference sample is an outlier and to dismiss the reference sample by discriminating that the reference sample does not belong to the corresponding class in case that the Euclidian distance at an average value of the reference sample for the class to which the reference sample does not belong exceeds a predetermined threshold value.

* * * * *